Sept. 28, 1965 E. ZADRON 3,208,714
FRANGIBLE WELDING PLUG
Filed Feb. 17, 1961
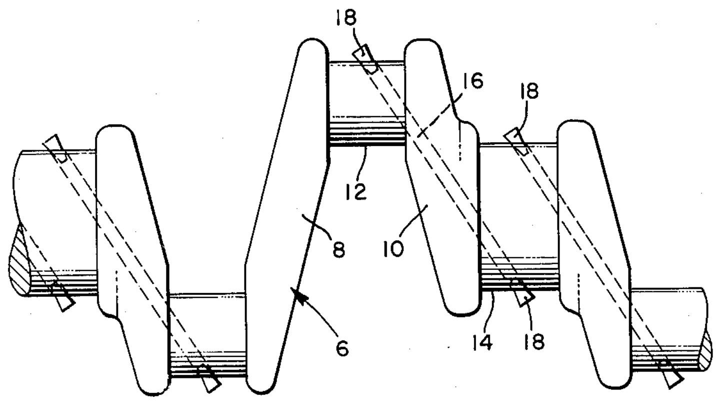
FIG. 1.
FIG. 2.
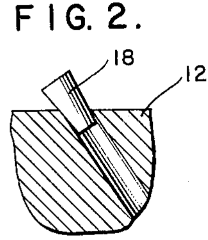
FIG. 3.
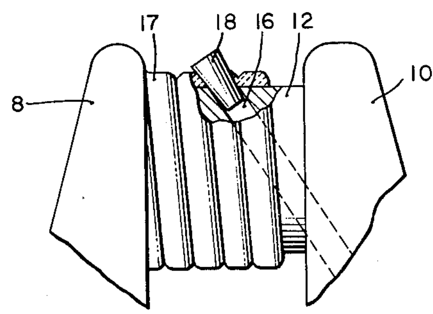
FIG. 4.
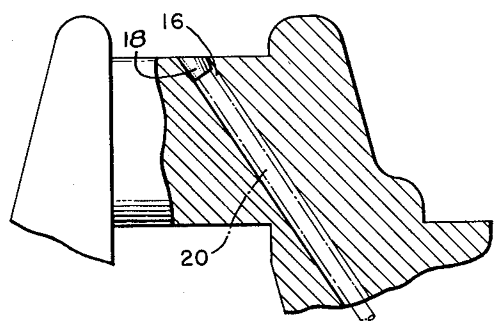
INVENTOR.
EMIL ZADRON
BY *Hazard & Miller*
ATTORNEYS.

United States Patent Office 3,208,714 Patented Sept. 28, 1965

3,208,714

FRANGIBLE WELDING PLUG

Emil Zadron, 1419 Lake Shore Ave., Los Angeles, Calif.

Filed Feb. 17, 1961, Ser. No. 90,077
3 Claims. (Cl. 249—204)

This invention relates to a welding plug and more particularly to one which is adapted to close and protect an aperture in the work while the work is being subjected to an overlay of metal from a welding rod or wire, and wherein the plug is readily removable from the aperture after the welding operation or after welding and finishing operations have been completed.

As a specific example, internal combustion engine crank shafts which have become considerably worn, require the addition of metal about the bearing portions thereof followed by machining of the bearing portions to its original diameter and roundness.

Heretofore crank shaft bearings have been built up by what is known as spray welding, but such an operation has more recently been supplanted by spiral welding, in the latter case a weld is laid spiral about the crank shaft bearing from end to end and then machined down to the original bearing diameter. In such an operation it has been found extremely difficult to protect and keep open the ends of the lubrication conduits which extend from the circumferential surface of one bearing portion to that of an adjacent bearing portion, the conduit extending through the "throw" of the crank shaft.

It is a general object of the present invention to provide a plug for each end of the lubrication conduit which will fully protect the ends of the conduit during the welding operation, and which will not fuse with the work and the built-up weld, will not melt and expose the conduit during the welding, will not cause any interference with the welding operation, but yet is readily removable when the welding is completed.

Another object is to provide a welding plug of the type described which can be left in the end of the lubrication conduit and can be machined with the overlaid weld on the bearing to keep particles of metal from falling into the lubrication conduit and the remainder of the plug readily removed upon completion of the machining or turning operation.

A further object of the invention is to provide a welding plug of the type described which is relatively inexpensive so that it is capable of a single use and may readily be removed from the lubrication conduit by utilizing a plug material, which while capable of being machined, can easily be broken out of the conduit.

The above and other objects of the invention will more fully appear from the following description in connection with the accompanying drawing:

FIG. 1 is an elevational view of a portion of an internal combustion engine and crank shaft illustrating the lubrication conduits in broken lines with welding plugs inserted in their ends;

FIG. 2 is an enlarged fragmentary detail of part of a bearing portion or a crank shaft with one end of a lubrication conduit and my welding plug inserted therein;

FIG. 3 is an enlarged fragmentary detail of a bearing portion of a crank shaft with part of a spiral weld laid thereon, portions being broken away to show my welding plug in an end of a lubrication conduit;

FIG. 4 is a view partially in side elevation and partially in section of a bearing portion of a crank shaft which has been restored by welding and machining and showing a portion of one of the welding plugs remaining in the lubrication conduit, the remainder having been machined away with the excess weld.

In the drawing there is shown a crank shaft 6 having throws 8 and 10 between the ends of which are a bearing 12. To the right of the throw 10 is another similar bearing 14, a lubrication conduit 16 extends from the circumferential surface of the bearing portion 12 to that of the bearing portion 14, said conduit extending angularly through the throw 10.

In FIG. 3 the bearing portion 12 is shown with a spiral weld 17 laid thereon. In this view the weld is shown extending axially of the weld through most of the length of the bearing portion 12 but it is to be understood that the weld will extend completely from the inside face of the throw 8 to the inside face of the throw 10, thereby completely covering the surface of the bearing portion 12.

Prior to forming the spiral weld 17 on the bearing portion 12, my welding plug 18 is inserted in each end of the lubrication conduit 16. Thus, during the welding operation, the ends of the lubrication conduit 16 cannot be filled or obstructed by the metal of the weld.

The welding plug 18 cannot of course be of a material which will melt and run off under the heat of the weld or fuse with the metal of the weld or that of the bearing portion of the crank shaft. It must be capable of withstanding the welding heat and must also be readily removable when desired, i.e. either after the welding operation or after the bearing portion of the crank shaft has been machined to its original diameter or to the diameter desired.

The plug should be of a dielectric material, because if an electrical conductor is used, the weld will be deposited over the plug and its ready removal prevented. Furthermore, if a conductor such as carbon is used, it will give off a gas which will throw a spray of the welding metal back into the gun and obstruct feeding of the welding wire.

I have found that if an earthy material or clay is used, it will produce the results desired. The clay is formed preferably by molding or by any other suitable means into the desired shape and diameter and then fired in a furnace in the manner of manufacturing ceramics generally. However, the plug is not fired to the extent that it will become glazed on its outer surface. If it is glazed, the welding heat will cause the plug to crack and disintegrate.

While many clays have a lower melting point than the welding arc, the plug is molded to a high enough density that it can absorb and dissipate heat so that melting is prevented.

Another advantage of the use of a molded and baked clay is that the plug can be left in the end of the lubrication conduit during the machining of the metal of the weld and the plug machined off with the metal as indicated in FIG. 4. This keeps the lubrication conduit clear of any particles of metal which are cut off during the machining operation.

As shown in the drawings, the plug 18 is tapered slightly so that it can be pressed into the end of the lubrication conduit sufficiently tightly so that it will not become accidentally dislodged. The taper is also desirable for the reason that the lubrication conduits vary slightly in size and a single size of plug can be used for lubrication conduits of slightly varying diameters, although several sizes of plugs are required for use in crank shafts of different manufacturers because of considerable differences in lubrication conduit diameters.

As shown in FIG. 3, the weld 17 can be placed spirally about the bearing portion 12 of the crank shaft 6 so that the welding metal will cover the bearing portion right up to the end opening of the lubrication conduit. The weld can be laid around the aperturing end of the plug or can be laid on the bearing in an even spiral so that it would in effect overlay the plug 18. However, since the material of the plug will not fuse with the welding metal, there will be no actual overlay of the plug, and the spiral will terminate at one side of the plug and resume at the other.

If the plug is removed either at the end of the welding operation or after machining of the welded bearing portion, it can readily be removed by breaking it up with an instrument such as a rod 20, shown in FIG. 4, inserted through the lubrication conduit 16. When struck by a hammer the rod will dislodge the plug either in its entirety or in pieces. With a plug in each end of the conduit 16, the first plug can be broken up and dislodged inwardly and it and the plug at the other end knocked out of said other end of the conduit.

It will of course be understood that various changes can be made in the form and details of the plug structure without departing from the spirit of the invention.

I claim:

1. A plug for temporarily closing apertures in work during welding comprising a frangible body of ceramic material which has been fired without glazing and which is capable of withstanding welding temperatures without melting or disintegrating.

2. A plug for use in temporarily filling an aperture in metal on which a metal weld overlay is to be placed to prevent the metal weld from filling the aperture, comprising a solid elongated plug being composed of a ceramic material which has been fired without surface glazing, said plug having a uni-directional taper with intermediate portions of diameters to provide a wedging fit in the outer end of the aperture and completely close the same, and said plug having its larger end larger than the aperture to be plugged and extending lengthwise beyond said intermediate diameter portions a distance greater than the depth of the metal weld to be overlaid.

3. A plug for use in temporarily filling an aperture in metal on which a metal weld overlay is to be placed to prevent the metal weld from filling the aperture, comprising a solid elongated plug comprising a clay body which has been fired without glazing and which has the quality of being workable in a lathe yet being capable of being broken out of the aperture in which it is inserted, said plug having a uni-directional taper with intermediate portions of diameters to provide a wedging fit in the outer end of the aperture and completely close the same, and said plug having its larger end larger than the aperture to be plugged and extended lengthwise beyond said intermediate diameter portions a distance greater than the depth of the metal weld to be overlaid.

References Cited by the Examiner

UNITED STATES PATENTS

| | | | |
|---|---|---|---|
| 728,552 | 5/03 | Dixon | 22—148 |
| 2,113,445 | 4/38 | Estep | 22—148 XR |
| 2,444,140 | 6/48 | Messler | 22—148 |
| 2,796,843 | 6/57 | Kleppinger | 113—111 |
| 2,847,958 | 8/58 | Norton et al. | 113—111 |

WHITMORE A. WILTZ, *Primary Examiner.*

JOHN F. CAMPBELL, *Examiner.*